(12) United States Patent
Nagaoka et al.

(10) Patent No.: US 11,796,758 B2
(45) Date of Patent: Oct. 24, 2023

(54) DRIVING DEVICE AND IMAGE PICKUP APPARATUS INCLUDING THE DRIVING DEVICE

(71) Applicant: CANON KABUSHIKI KAISHA, Tokyo (JP)

(72) Inventors: Nobuyuki Nagaoka, Tochigi (JP); Kazuhiro Noguchi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 276 days.

(21) Appl. No.: 17/241,367

(22) Filed: Apr. 27, 2021

(65) Prior Publication Data

US 2021/0341704 A1 Nov. 4, 2021

(30) Foreign Application Priority Data

Apr. 30, 2020 (JP) ................................ 2020-080430

(51) Int. Cl.
*G02B 7/09* (2021.01)
*G03B 13/34* (2021.01)

(52) U.S. Cl.
CPC ............... *G02B 7/09* (2013.01); *G03B 13/34* (2013.01)

(58) Field of Classification Search
CPC ........ G02B 13/16; G02B 13/12; G02B 13/02; G02B 13/18; G02B 13/143; G02B 13/04; G02B 13/22; G02B 13/004; G02B 13/06; G02B 13/24; G02B 13/0006; G02B 13/00; G02B 13/0005; G02B 13/009; G02B 15/177; G02B 15/14; G02B 15/20; G02B 17/0892; G02B 17/08; G02B 17/0812; G02B 17/0804; G02B 17/0844; G02B 17/0856; G02B 17/0647; G02B 17/0657; G02B 17/0828; G02B 17/0848; G02B 17/0852; G02B 1/02; G02B 1/33; G02B 1/08; G02B 27/0025; G02B 27/0068; G02B 27/0062; G02B 27/024; G02B 27/1026; G02B 27/4216; G02B 27/4283; G02B 27/48; G02B 27/0018; G02B 27/0037; G02B 27/0043; G02B 27/4211; G02B 3/00; G02B 3/0081; G02B 3/04; G02B 3/06; G02B 3/10; G02B 7/028; G02B 7/023;

(Continued)

(56) References Cited

U.S. PATENT DOCUMENTS 9,219,429 B2 12/2015 Yamanaka
11,165,368 B2 * 11/2021 Yamasaki ............. H02N 2/001

FOREIGN PATENT DOCUMENTS

JP 2014212682 A 11/2014
JP 2016126186 A 7/2016
JP 2019213311 A 12/2019

* cited by examiner

*Primary Examiner* — Darryl J Collins
*Assistant Examiner* — Tamara Y. Washington
(74) *Attorney, Agent, or Firm* — ROSSI, KIMMS & McDOWELL LLP

(57) ABSTRACT

Provided is a driving device including: a lens holder configured to hold an optical lens; a vibration wave motor including a movable-side rail member; a spherical member configured to connect the movable-side rail member and the lens holder to each other and transmit power; and a lens-barrel urging spring configured to urge the lens holder toward the movable-side rail member, wherein the spherical member and the lens-barrel urging spring are arranged at different positions when seen from an optical axis direction.

11 Claims, 14 Drawing Sheets

(58) Field of Classification Search
CPC .......... G02B 7/04; G02B 7/08; G02B 7/1815; G02B 26/0833; G02B 26/0825; G02B 26/0841; G02B 9/62; G02B 9/64; G02B 9/12; G02B 9/20; G02B 9/34; G02B 19/0014; G02B 19/0066; G03F 7/70341; G03F 7/70225; G03F 7/70241; G03F 7/70308; G03F 7/70958; G03F 7/7015; G03F 7/70233; G03F 7/70966; G03F 7/70091; G03F 7/702; G03F 7/70258; G03F 7/70891; G03F 7/70066; G03F 7/70075; G03F 7/70191; G03F 7/70216; G03F 7/7025; G03F 7/70266; G03F 7/70275; G03F 7/703; G03F 7/70325; G03F 7/7035; G03F 7/70358; G03F 7/70558; G03F 7/70575; G03F 7/706; G03F 7/70783; G03F 7/70825; G03F 7/70975; G03F 7/70983; G03F 1/62

See application file for complete search history.

DRIVING DEVICE AND IMAGE PICKUP APPARATUS INCLUDING THE DRIVING DEVICE

This application claims the benefit of Japanese Patent Application No. 2020-080430, filed Apr. 30, 2020, which is hereby incorporated by reference herein in its entirety.

BACKGROUND OF THE INVENTION

Field of the Invention

The present disclosure relates to a driving device and an image pickup apparatus including the driving device.

Description of the Related Art

An ultrasonic motor includes a guide unit for taking vibration of a vibrator in a predetermined driving direction, and the vibrator and a friction member are configured to be movable relative to each other. In Japanese Patent Application Laid-Open No. 2014-212682, there is disclosed a technology of coupling the ultrasonic motor and a lens retention frame to each other through use of a pivotably movable transmission member.

In the configuration as disclosed in Japanese Patent Application Laid-Open No. 2014-212682, when a heavy lens group is driven, it is required to increase a pressing force of urging the transmission member. With this configuration, a length between an applied position of the pressing force and a guide bar is small. Thus, slide resistance of the guide bar is increased.

SUMMARY OF THE INVENTION

An object of the present disclosure is to provide a driving device capable of reducing slide resistance and improving driving efficiency.

According to the present disclosure, there is provided a driving device including: a holding member configured to hold an optical element; a driving source including a moving member; a transmission portion configured to connect the moving member and the holding member to each other and transmit power; and an urging mechanism configured to urge the holding member toward the moving member, wherein the transmission portion and the urging mechanism are arranged at different positions when seen from a first direction.

It is possible to provide the driving device capable of reducing slide resistance and improving driving efficiency.

Further features of the present invention will become apparent from the following description of exemplary embodiments with reference to the attached drawings.

DESCRIPTION OF THE EMBODIMENTS

First Embodiment

Figure 1:
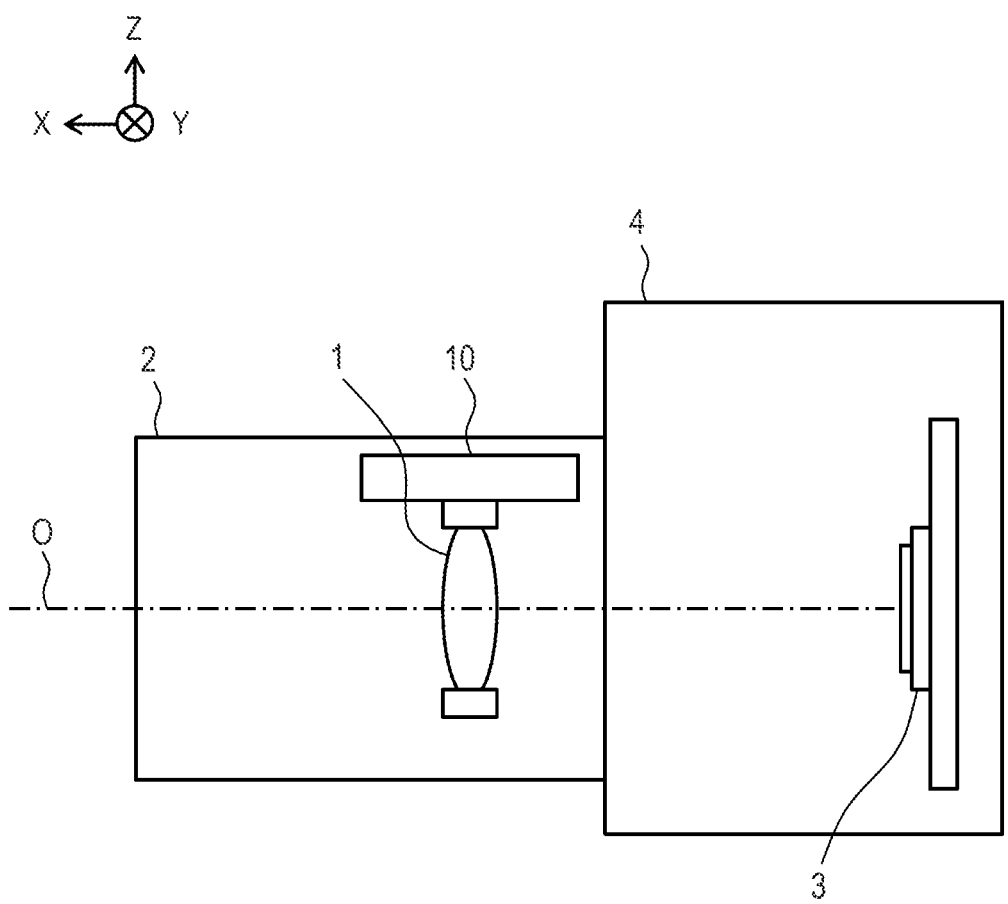
FIG. 1 is a schematic view for illustrating a configuration of an image pickup apparatus to which the present disclosure is applicable.

Preferred embodiments of the present invention will now be described in detail in accordance with the accompanying drawings. FIG. 1 is a schematic view for illustrating a configuration of an image pickup apparatus to which the present disclosure is applicable. Herein, description is made of a case in which a driving device including a vibration wave motor 10 being a driving source is installed in an image pickup apparatus, but this description does not limit the present disclosure. Further, description is made of the image pickup apparatus including an image pickup lens unit 2 and a camera body 4, which are integrated with each other and described later. However, the image pickup lens unit 2 may be an exchangeable lens. Moreover, in the drawings, an optical axis direction O being a moving direction is defined as an X-axis direction, and a normal direction of a contact portion 102a of a vibration plate 102 to be described later is defined as a Z-axis direction. Further, a direction orthogonal to the X-axis direction and the Z-axis direction is defined as a Y-axis direction.

As illustrated in FIG. 1, a main body of the image pickup apparatus includes the image pickup lens unit 2 and the camera body 4. Inside the image pickup lens unit 2, an optical lens 1 (optical element) is coupled to the vibration wave motor 10. Through movement of a vibrator 101 of the vibration wave motor 10 to be described later, the optical lens 1 is movable in a direction substantially parallel to the optical axis direction O.

A lens barrel 11 including the optical lens 1, and the vibration wave motor 10 form the driving device according to the present disclosure, which is configured to drive the lens barrel 11. In the driving device in which the optical lens 1 is a focusing lens, at the time of image pickup, the focusing lens is moved in the direction substantially parallel to the optical axis direction O, and an object image is formed at a position of an image pickup element 3, thereby being capable of forming a focused image.

Figure 2:
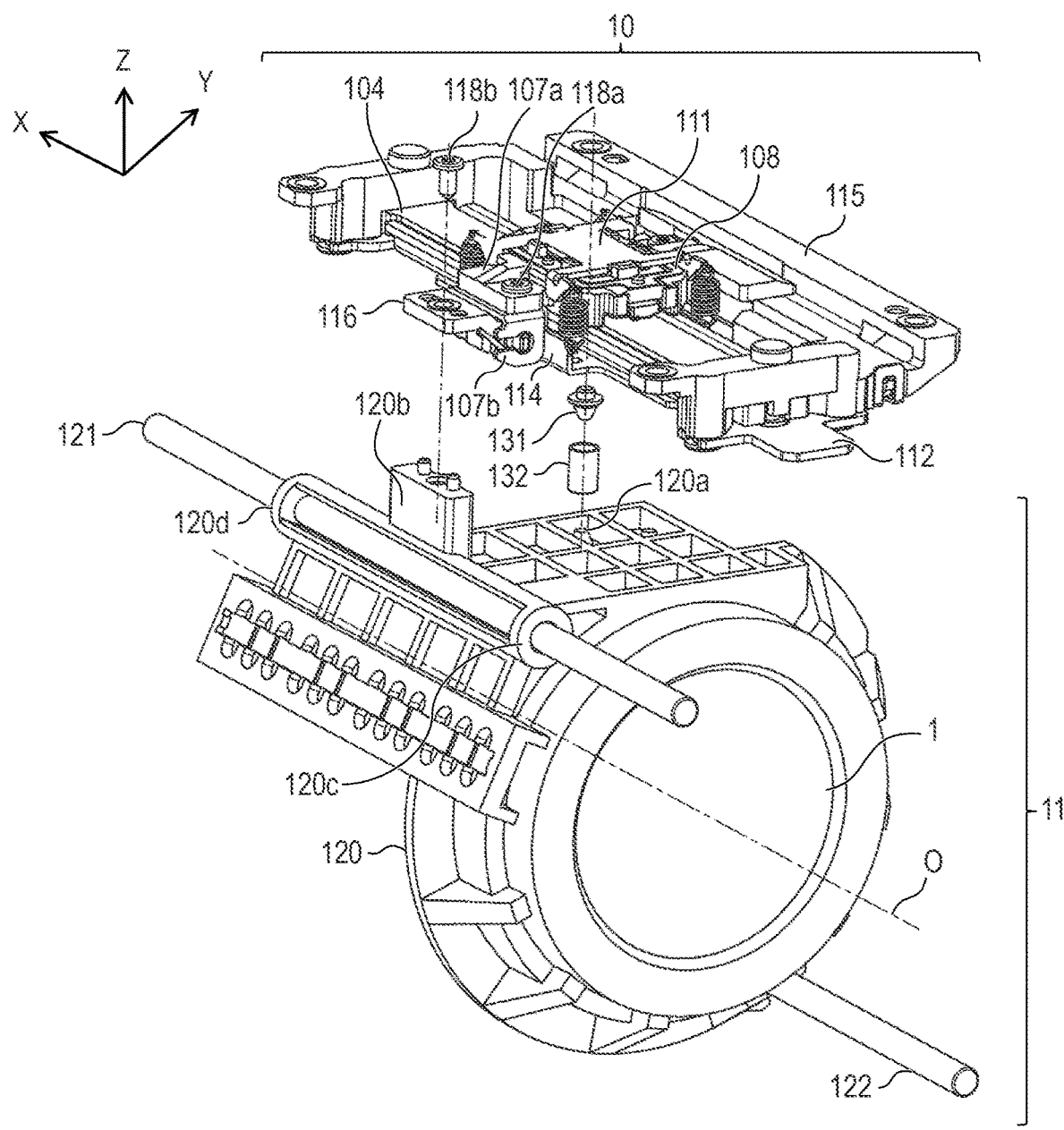
FIG. 2 is an exploded perspective view for illustrating a driving device according to a first embodiment including a vibration wave motor (10) and a lens barrel (11).
Figure 3:
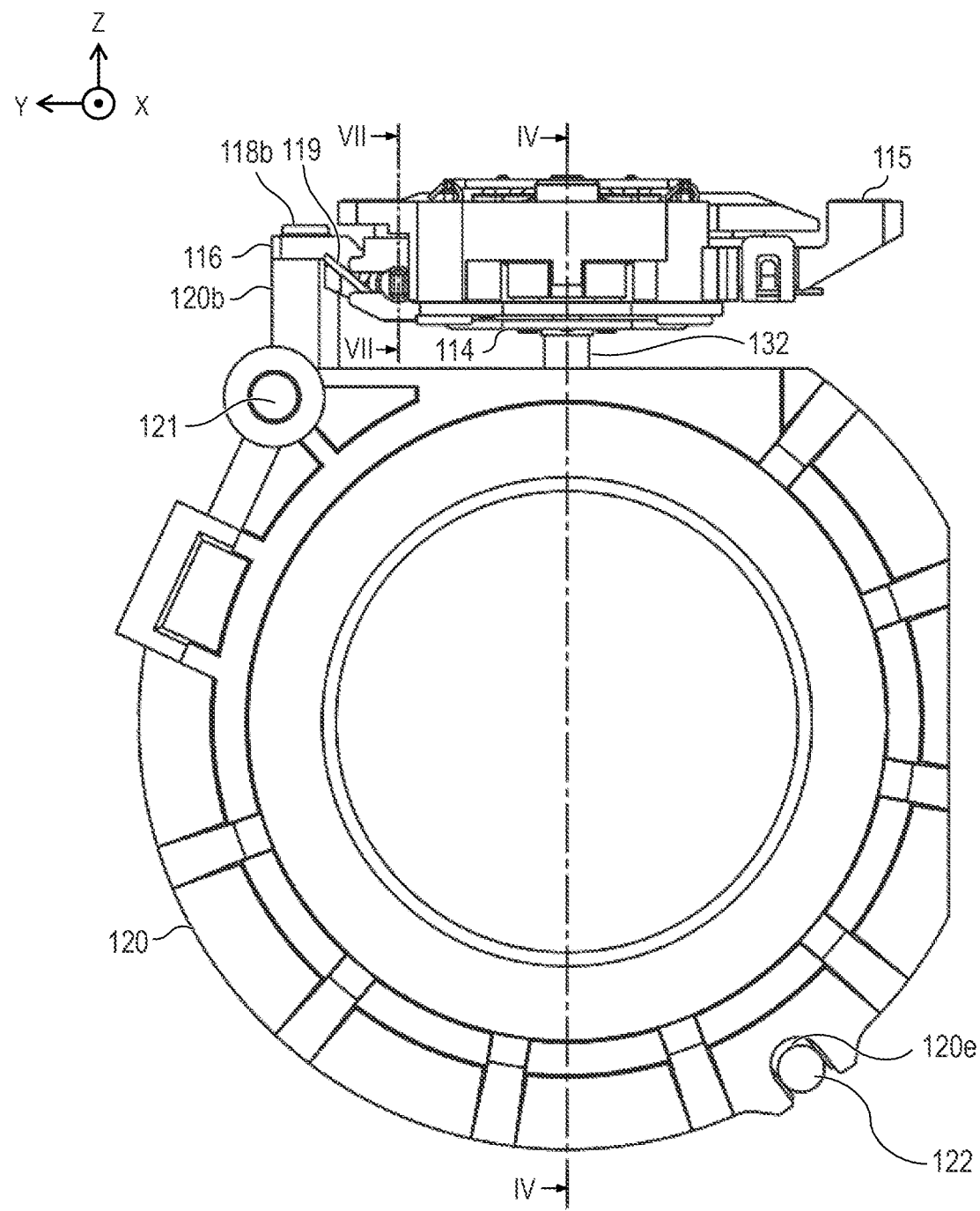
FIG. 3 is a side view for illustrating the driving device according to the first embodiment when seen from an X-axis direction.
Figure 4:
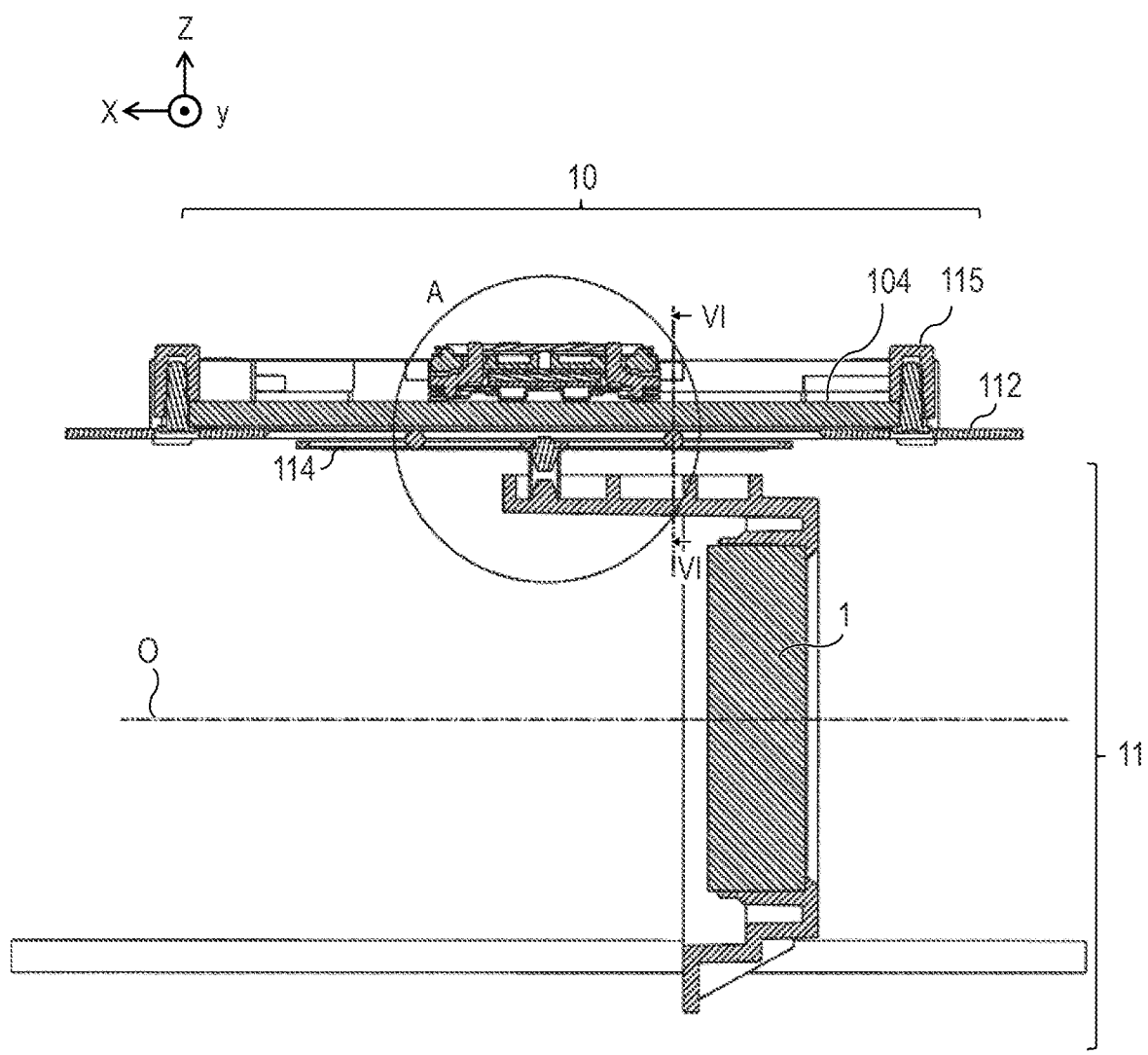
FIG. 4 is a sectional view for illustrating the driving device according to the first embodiment.
Figure 5:
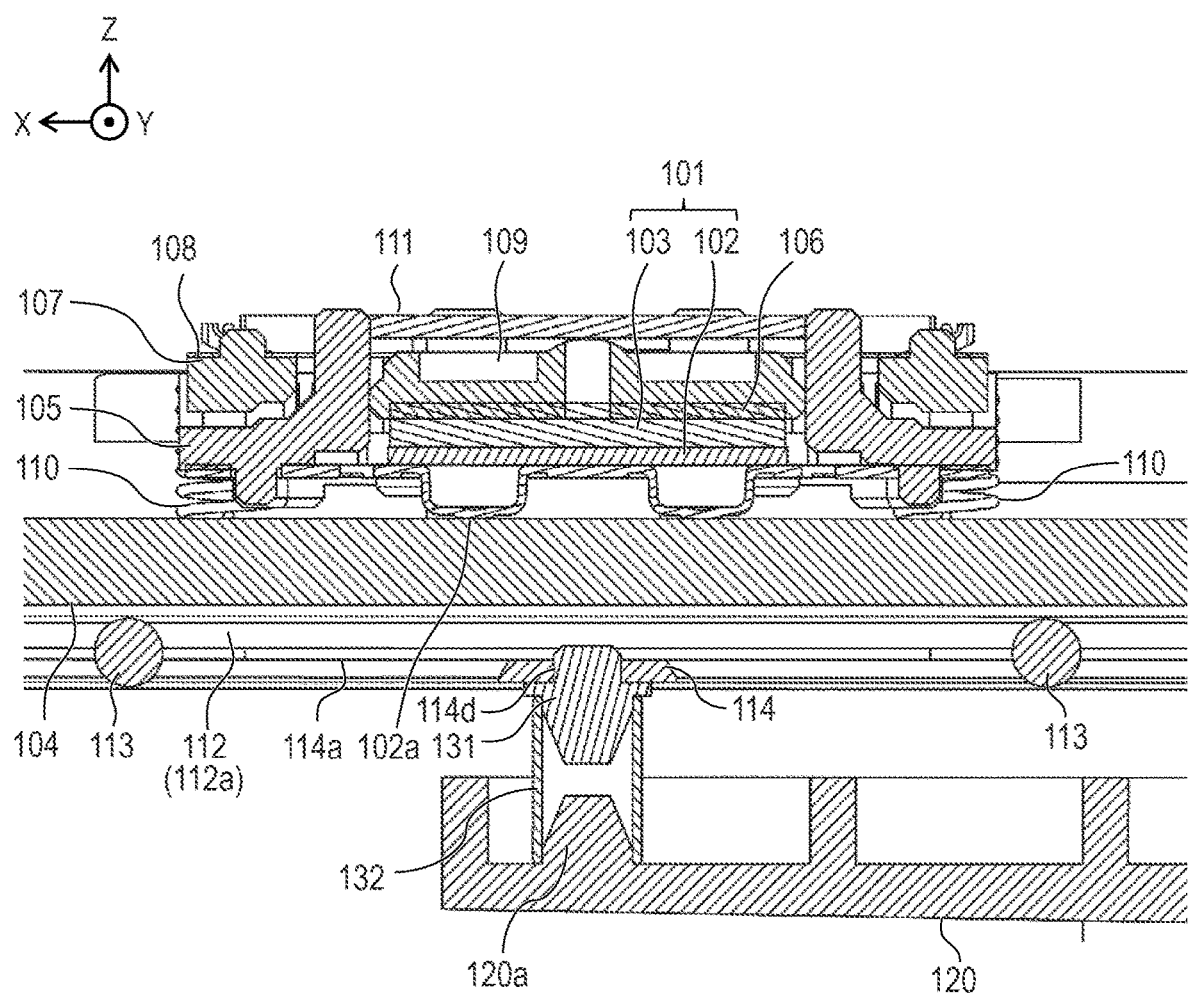
FIG. 5 is an enlarged sectional view for illustrating the driving device according to the first embodiment.

Next, a configuration of the vibration wave motor 10 in the first embodiment of the present disclosure is described with reference to FIG. 2 to FIG. 5. FIG. 2 is an exploded perspective view for illustrating the driving device according to the first embodiment including the vibration wave motor 10 and the lens barrel 11. FIG. 3 is a side view for illustrating the driving device according to the first embodiment when seen from the X-axis direction. FIG. 4 is a sectional view for illustrating the driving device taken along the line IV-IV of FIG. 3. FIG. 5 is an enlarged sectional view for illustrating a region enclosed by the circle A of FIG. 4.

As illustrated in FIG. 5, the vibrator 101 of the vibration wave motor 10 includes the vibration plate 102 and a piezoelectric element 103. The vibration plate 102 is a vibrating body having elasticity. The vibration plate 102 and the piezoelectric element 103 are bonded to each other with, for example, a publicly-known adhesive. The piezoelectric element 103 is configured to excite vibration (ultrasonic vibration) having frequencies in a high frequency region through application of a voltage.

The vibrator 101 and a first holding member 105 are fixed to each other with, for example, a publicly-known adhesive, but a fixing method for the vibrator 101 and the first holding member 105 is not limited as long as the vibrator 101 and the first holding member 105 are fixed to each other. A lower pressure plate 109 is arranged above the vibrator 101 in the Z-axis direction, and an elastic member 106 is arranged between the lower pressure plate 109 and the piezoelectric element 103. The elastic member 106 prevents direct contact between a pressure portion of the lower pressure plate 109 and the piezoelectric element 103, thereby preventing damage to the piezoelectric element 103.

A second holding member 107 is coupled to the first holding member 105 through intermediation of a thin metal sheet 108. Thus, the second holding member 107 is moved together with the first holding member 105 when the first holding member 105 is moved along the X-axis direction being the optical axis direction O.

A friction member 104 and a stationary-side rail member 112 are fixed to a base member 115 by a publicly-known technology such as using a screw. Further, the base member 115 is fixed to a fixing member (not shown) with, for example, a screw.

A spring 110 is hooked to an upper pressure plate 111 at one end thereof, and hooked to a movable-side rail member 114 (moving member) at another end thereof. Four springs 110 couple two components, that is, the upper pressure plate 111 and the movable-side rail member 114 to each other. Pressure applied by the springs 110, which is received by the upper pressure plate 111, is transmitted to the vibrator 101 through the lower pressure plate 109 and the elastic member 106, thereby bringing the vibrator 101 into friction contact with the friction member 104. A direction of applying pressure by the four springs 110 corresponds to a negative direction of the Z axis.

The movable-side rail member 114 includes two movable-side guide portions 114a each having a V-groove shape, and rolling balls 113 (rolling members) are arranged in the movable-side guide portions 114a, respectively. Meanwhile, the stationary-side rail member 112 includes a stationary-side guide portion 112a having a V-groove shape. That is, the plurality of rolling balls 113 are held between the stationary-side guide portion 112a of the stationary-side rail member 112 and the movable-side guide portions 114a of the movable-side rail member 114. The movable-side rail member 114 is always urged by the springs 110 toward the upper pressure plate 111 side, and hence the rolling balls 113 are always held in abutment against the stationary-side guide portion 112a and the movable-side guide portions 114a. Further, the movable-side guide portion 114a and the stationary-side guide portion 112a each having a V-groove shape, and the rolling ball 113 are arranged so as to be substantially aligned with each other at a position of the vibrator 101 in the Y-axis direction.

The stationary-side rail member 112, the rolling balls 113, and the movable-side rail member 114 form a first guide unit in the first embodiment. The first guide unit is configured to guide the vibration wave motor 10 in the substantially X-axis direction, and guide the vibration wave motor 10 so as to enable the vibration wave motor 10 to rotate about an axis along the substantially X-axis direction. At this time, a direction in which the vibration wave motor 10 is guided by the first guide unit corresponds to a first direction in the first embodiment, and the first direction conforms to the optical axis direction O.

Next, a driving mechanism achieved by the vibration wave motor 10 is described. The vibration plate 102 includes at least one contact portion 102a. The contact portion 102a is held in contact with the friction member 104 under a state in which the contact portion 102a is pressed and urged by the pressure applied by the springs 110 described above. When a driving voltage is applied to the piezoelectric element 103, ultrasonic vibration is excited so that a resonance phenomenon occurs in the vibrator 101.

At this time, two types of standing waves are generated in the vibrator 101 so that a substantially elliptic motion is produced in the contact portion 102a of the vibration plate 102. Under the above-mentioned state in which the vibration plate 102 and the friction member 104 are held in pressure contact with each other, the substantially elliptic motion produced in the vibrator 101 is efficiently transmitted to the friction member 104.

As a result, the first holding member 105, the second holding member 107, the movable-side rail member 114, and a coupling member 116, which are integrated with the vibrator 101, are moved with respect to the friction member 104 in the first direction (substantially X-axis direction) in which the vibration wave motor 10 is guided by the first guide unit. Further, a lens holder 120 (holding member) connected to the coupling member 116 is also moved together in a second direction that substantially conforms to the first direction.

Next, with reference to FIG. 2 and FIG. 3, a configuration of the lens barrel 11 configured to hold the optical lens 1 is described. The lens barrel 11 mainly includes the lens holder 120, a first guide bar 121, and a second guide bar 122 (third guide unit). The lens holder 120 is configured to hold the optical lens 1. The first guide bar 121 is fixed to the fixing member (not shown).

A circular hole 120c and a circular hole 120d are formed in the lens holder 120. The first guide bar 121 is loosely fitted into two holes, that is, the circular hole 120c and the circular hole 120d so that the first guide bar 121 is guided linearly so as to be rotatable about the axis parallel to the X-axis direction. The first guide bar 121, the circular hole 120c, and the circular hole 120d form a second guide unit in the first embodiment. At this time, a direction in which the lens holder 120 is guided linearly by the second guide unit corresponds to the second direction.

Further, a U-shaped groove portion 120e is formed on a side radially opposite to the circular hole 120c of the lens holder 120. The second guide bar 122 being a rotation regulation member is held in abutment against the U-shaped groove portion 120e, thereby regulating rotation of the lens holder 120 about the X axis. With this configuration, rotation of the lens holder 120 is regulated, and hence the lens holder 120 is guided linearly in the X-axis direction without rotating. The second guide bar 122 and the U-shaped groove portion 120e form the third guide unit in the first embodiment.

Figure 6:
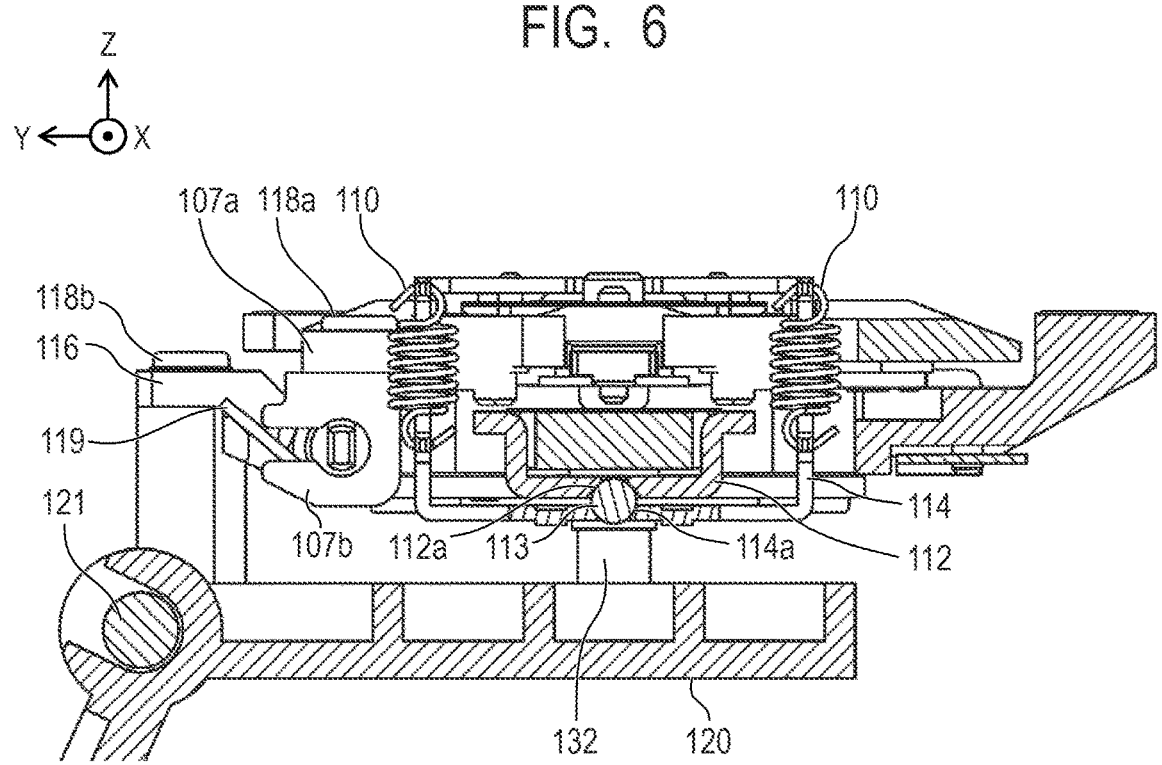
FIG. 6 is a sectional view for illustrating the driving device according to the first embodiment.
Figure 7:
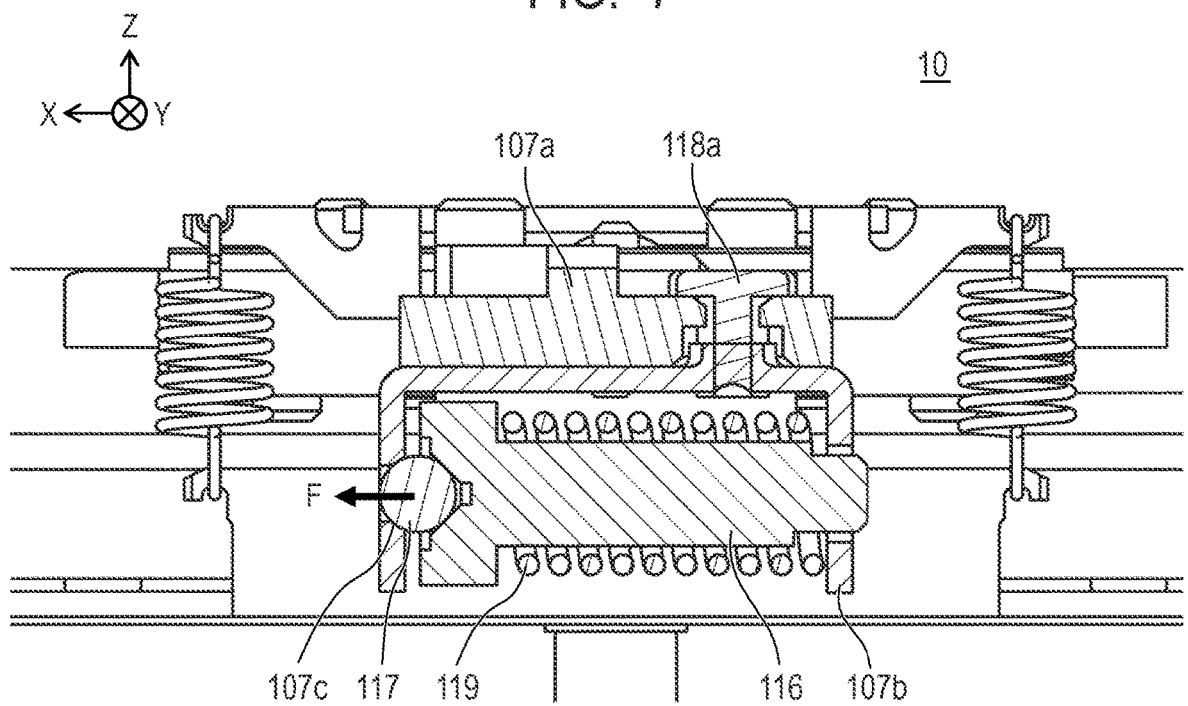
FIG. 7 is a sectional view for illustrating the vibration wave motor (10) in the first embodiment.

Next, with reference to FIG. 2, FIG. 6, and FIG. 7, description is made of a coupling mechanism in the first embodiment configured to couple the vibration wave motor 10 and the lens barrel 11 to each other and transmit power of the vibration wave motor 10. FIG. 6 is a sectional view for illustrating the driving device taken along the line VI-VI of FIG. 4. FIG. 7 is a sectional view for illustrating the vibration wave motor 10 taken along the line VII-VII of FIG. 3.

The second holding member 107, which forms a part of a movable portion of the vibration wave motor 10, includes an output portion 107a configured to output the power of the vibration wave motor 10. An accommodation portion 107b having a substantially U shape is fixed to the output portion 107a with a screw 118a. In the accommodation portion 107b, the coupling member 116, a spherical member 117, and a coupling-member urging spring 119 are provided. The coupling member 116 forms a power transmission portion (transmission portion) configured to transmit the power of the vibration wave motor 10. The coupling-member urging spring 119 is configured to urge the coupling member 116.

The coupling-member urging spring 119 is arranged between the coupling member 116 and the accommodation portion 107b, and is configured to urge the coupling member 116 and the spherical member 117 in the X-axis direction. Further, the spherical member 117 is always held in abutment against a guide groove 107c extending in the Y-axis direction and having a V-groove shape. With this configuration, there can be achieved a configuration capable of driving the vibration wave motor 10 and the lens barrel 11 together without involving occurrence of a backlash in the X-axis direction while absorbing misalignment between a direction of driving the vibration wave motor 10 and a direction of guiding the lens holder 120, and misalignment of the coupling member 116 and the spherical member 117 in the Y-axis direction.

The lens holder 120 includes a connection portion 120b to which the coupling member 116 is connected. The connection portion 120b includes two protruding portions protruding in the Z-axis direction. The protruding portions are fitted into two holes formed in the coupling member 116, and the coupling member 116 is fastened to the connection portion 120b with a screw 118b. Until the coupling member 116 is fastened with the screw 118b, the coupling member 116, the spherical member 117, and the coupling-member urging spring 119 are held in a unitized state in the vibration wave motor 10. After the coupling member 116 is fastened to the connection portion 120b, the coupling member 116 and the spherical member 117 function as components on the lens barrel 11 side.

Figure 8:
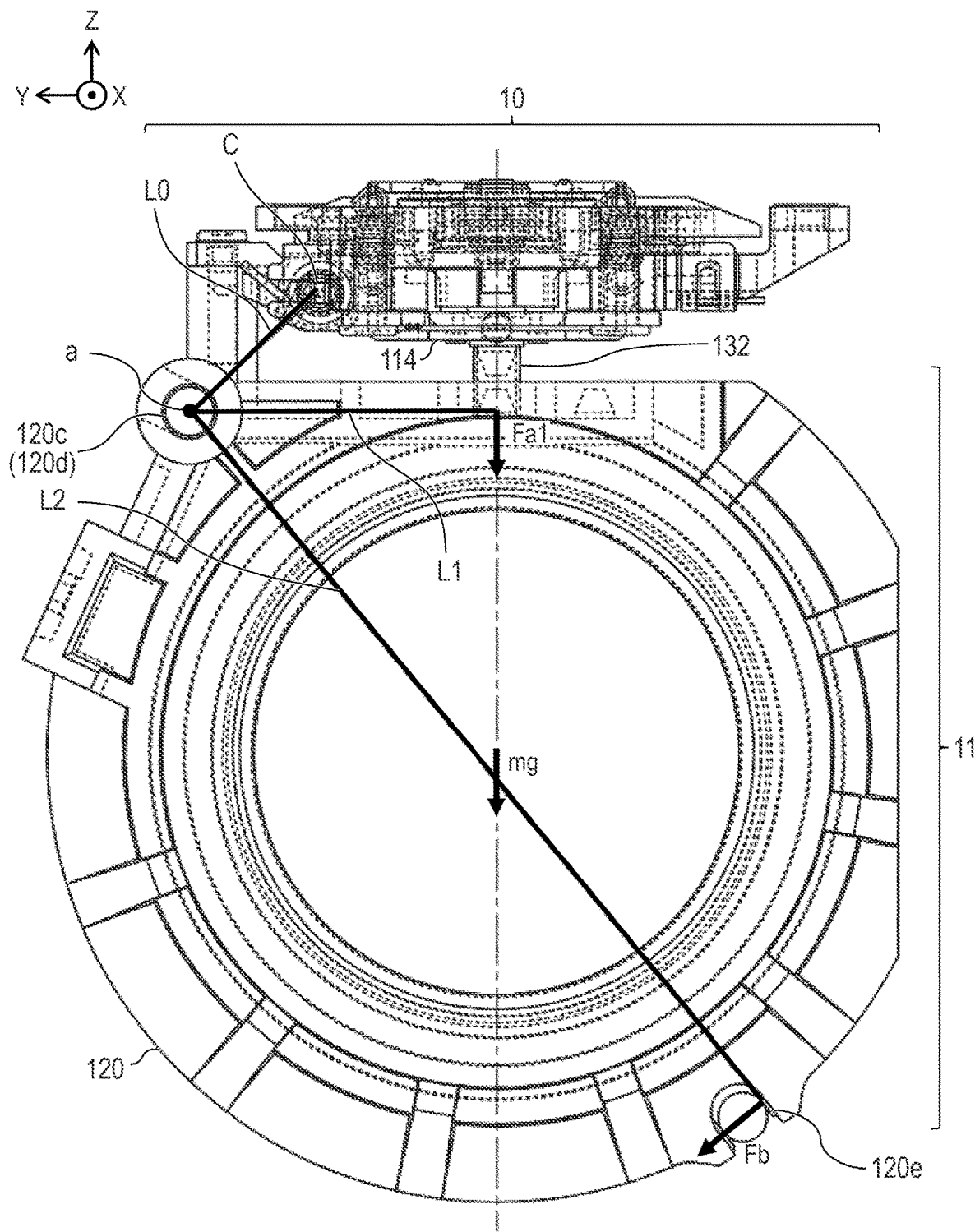
FIG. 8 is a side view for illustrating balance between moments when the driving device according to the first embodiment is seen from the X-axis direction.

Next, an urging mechanism in the first embodiment configured to urge the lens barrel 11, which is a specific configuration of the present disclosure, is described with reference to FIG. 2, FIG. 5, and FIG. 8. FIG. 8 is a side view for illustrating balance between moments when the driving device according to the first embodiment is seen from the X-axis direction.

First, after a shank portion of a shank member 131 is inserted into a fitting hole 114d (see FIG. 5) of the movable-side rail member 114 forming a part of the movable portion of the vibration wave motor 10, the shank member 131 is fixed by a fixing method such as using an adhesive. Next, a lens-barrel urging spring 132 being a helical compression spring is mounted to a projecting portion 120a formed on the lens holder 120, and the vibration wave motor 10 including the shank member 131 fixed thereto is mounted in the negative direction of the Z axis. Thus, the lens-barrel urging spring 132 is sandwiched between the shank member 131 and the projecting portion 120a. Further, the lens-barrel urging spring 132 sandwiched between the projecting portion 120a and the shank member 131 is elastically deformed, thereby being capable of allowing misalignment between a position of the projecting portion 120a of the lens holder 120 and a position of the shank member 131 included in the vibration wave motor 10. The urging mechanism in the first embodiment is formed by the shank member 131, the lens-barrel urging spring 132, and the projecting portion 120a.

With the configuration described above, an urging force Fa1 exerted by the lens-barrel urging spring 132 is applied to the lens holder 120 so as to rotate and urge the lens holder 120 about the X axis, thereby being capable of reducing a backlash between the circular hole 120c and the first guide bar 121, a backlash between the circular hole 120d and the first guide bar 121, and a backlash between the U-shaped groove portion 120e and the second guide bar 122.

The urging force Fa1 exerted by the lens-barrel urging spring 132, a self-weight "mg" of the lens barrel 11, and an urging force Fb acting on the U-shaped groove portion 120e are applied to the lens barrel 11. When a center of the circular hole 120c is defined as an axis of a rotation center "a", L1 represents a length from the rotation center "a" to a position of the lens-barrel urging spring 132 or a center of gravity, L2 represents a length from the rotation center "a" to a position at which the U-shaped groove portion 120e and the second guide bar 122 are held in abutment against each other, and L0 represents a length from the rotation center "a" to the spherical member 117 being an abutment point "c" of the power transmission portion.

It is required to set the urging force Fb sufficiently large enough to prevent axial misalignment of the lens barrel 11 at the time of driving. As the optical lens 1 becomes heavier, the required urging force Fb becomes larger. In order to increase the urging force Fb, it is required to increase the urging force Fa1 of the lens-barrel urging spring 132.

In the related-art configuration, as illustrated in FIG. 2 and FIG. 4 of Japanese Patent Application Laid-Open No. 2014-212682, a pivot member configured to transmit a driving force in the X-axis direction is urged by a compressive torsion spring, and the urged pivot member is configured to urge a lens barrel. Further, when L0 represents a length from a center of rotation of the pivot member to a guide bar, and L2 represents a length between the guide bar and a steady brace bar, the following relation (1) is satisfied. Thus, it is required to increase the length L0 in order to increase the urging force Fb.

$$L2 > L0 \qquad (1)$$

However, when the length L0 is increased, a distance of the pivot member from the rotation center "a" becomes larger, thereby increasing slide resistance of the guide bar and increasing a size of the device.

Therefore, the first embodiment of the present disclosure has such a feature that a member configured to urge the power transmission portion and a member configured to urge the lens barrel 11 are formed of separate members so as to achieve efficient urging. In the first embodiment, the following relation (2) is satisfied. The length L0 is equivalent to that in the related-art configuration, and hence there is no fear in that a lens barrel load is increased.

$$L2>L1>L0 \quad (2)$$

Moreover, a relation of L1>L0 is satisfied. Accordingly, even by the same urging force Fa1, the larger urging force Fb can be applied to the U-shaped groove portion 120e. Thus, without increasing an urging force applied to the circular hole 120c and the circular hole 120d, the desired urging force Fb can be applied to the U-shaped groove portion 120e.

With the configuration described above, a driving load on the driving device including the vibration wave motor 10 and the lens barrel 11 can be reduced. In the first embodiment, the lens-barrel urging spring 132, which is to be arranged between the lens holder 120 and the movable-side rail member 114, is described as the helical compression spring. However, various types of spring members such as a helical torsion spring and a flat spring are also applicable as the lens-barrel urging spring 132.

Second Embodiment

Figure 9:
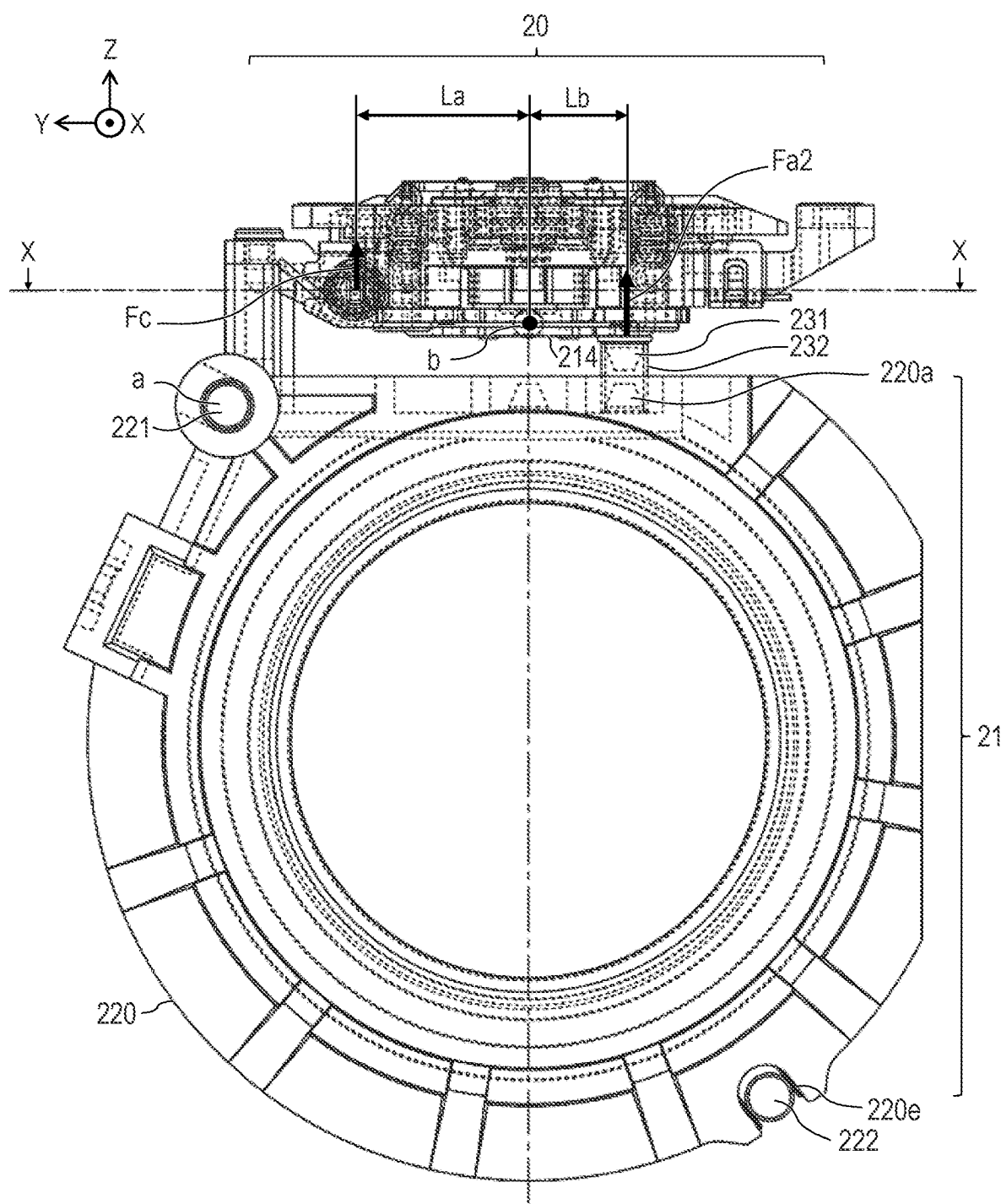
FIG. 9 is a side view for illustrating a driving device according to a second embodiment when seen from the X-axis direction.
Figure 10:
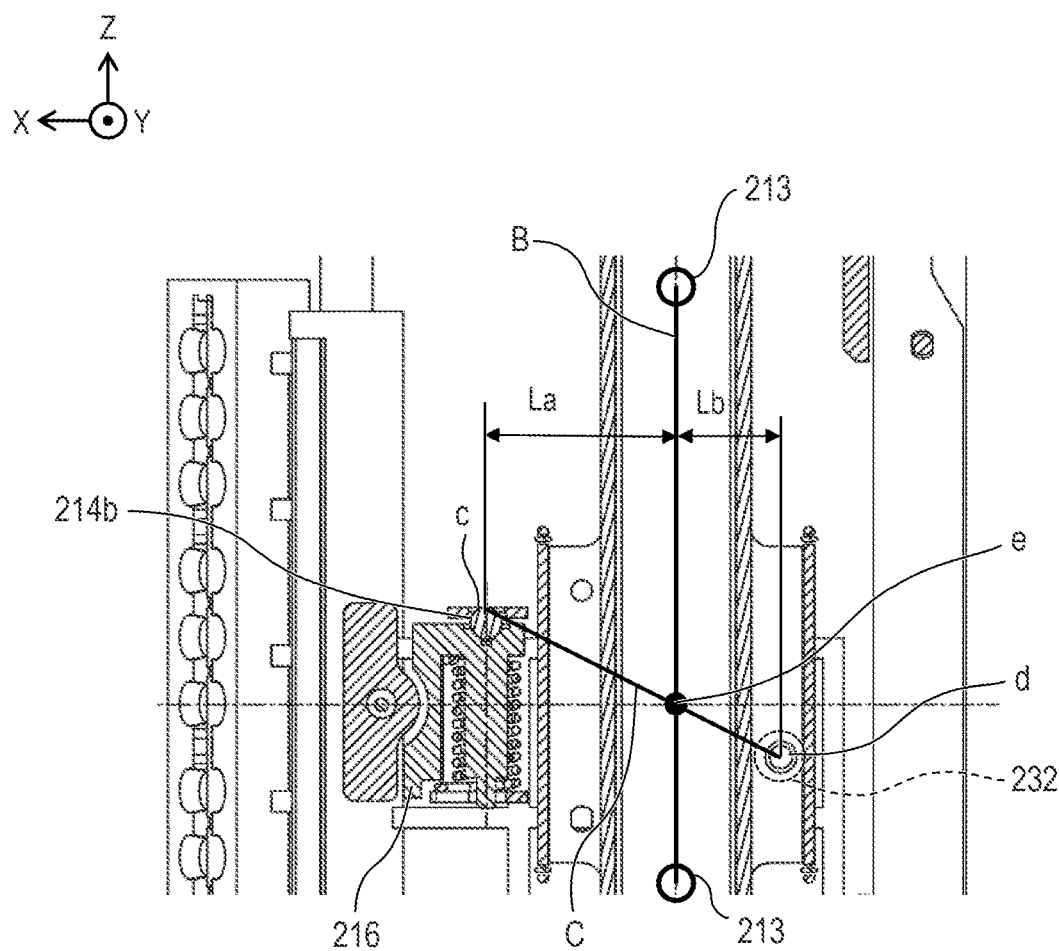
FIG. 10 is a sectional view for illustrating the driving device according to the second embodiment.
Figure 11:
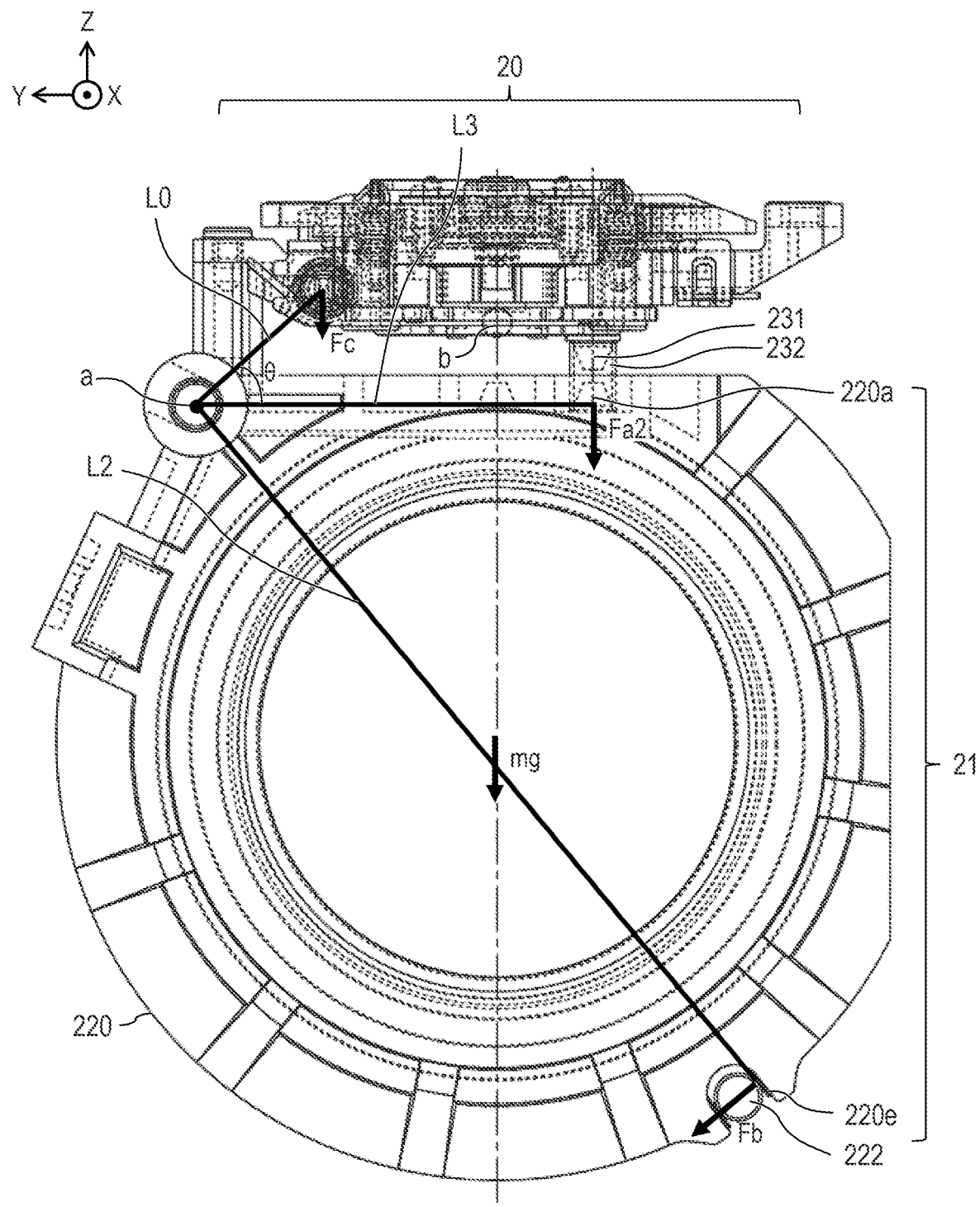
FIG. 11 is a side view for illustrating balance between moments when the driving device according to the second embodiment is seen from the X-axis direction.

Now, a second embodiment of the present disclosure is described with reference to FIG. 9 to FIG. 11. FIG. 9 is a side view for illustrating a driving device according to the second embodiment when seen from the X-axis direction. FIG. 10 is a sectional view for illustrating the driving device according to the second embodiment taken along the line X-X of FIG. 9. FIG. 11 is a side view for illustrating balance between moments when the driving device according to the second embodiment is seen from the X-axis direction. The second embodiment is different from the first embodiment in arrangement of a shank member 231, a lens-barrel urging spring 232, and a projecting portion 220a. In the description of the second embodiment, only differences from the first embodiment are described, and description of common components is omitted.

In the second embodiment, the shank member 231, the lens-barrel urging spring 232, and the projecting portion 220a are arranged at a distance L3 from the rotation center "a" of a lens holder 220 (holding member). As illustrated in FIG. 9 and FIG. 10, at an urging position "d", an urging force Fa2 exerted by the lens-barrel urging spring 232 (urging mechanism) is applied to a movable-side rail member 214 (moving member) in the Z-axis direction. Further, a vibration wave motor 20 (driving source) is supported by the first guide unit so as to be rotatable about the X axis, and hence tends to be rotated about the X axis by the urging force Fa2 of the lens-barrel urging spring 232.

The lens holder 220 can be moved in the X-axis direction by the second guide unit including a first guide bar 221, but rotation of the lens holder 220 is regulated due to a relationship between a U-shaped groove portion 220e and a second guide bar 222. Accordingly, rotation of the vibration wave motor 20 is regulated by a reaction force Fc acting between a coupling member 216 and the movable-side rail member 214.

Further, two rolling balls 213 and movable-side guide portions 214a, which form the first guide unit, the power transmission portion, and the lens-barrel urging spring 232 are arranged so that a straight line B connecting abutment positions between the rolling balls 213 and the movable-side guide portions 214a, and a straight line C connecting the abutment point "c" of the power transmission portion and the urging position "d" of the lens-barrel urging spring 232 intersect with each other at an intersection point "e". With this configuration, rotation of the movable-side rail member 214 about the Y axis is regulated.

With reference to FIG. 9, regarding moments about a guide center "b" of the first guide unit when seen from the X-axis direction, the following relation (3) is satisfied. La represents a length from the guide center "b" to the abutment point "c" of the power transmission portion, and Lb represents a length from the guide center "b" to the urging position "d".

$$La \times Fc = Lb \times Fa2 \quad (3)$$

The relation (3) expresses balance between the moments obtained in the vibration wave motor 20, and the reaction force Fc generated in the coupling member 216 acts on the lens holder 220. Further, not only the urging force Fa2 exerted by the lens-barrel urging spring 232 but also a moment of L0×COS θ×Fc acts on a lens barrel 21 (see FIG. 11). At this time, when the urging force Fb is constant, the moment caused by the reaction force Fc acts, thereby being capable of reducing the urging force Fa2. That is, a degree of freedom in design of the lens-barrel urging spring 232 is increased.

With the configuration described above, the degree of freedom in design can be increased while reduction in driving load on the driving device including the vibration wave motor 20 and the lens barrel 21 is achieved.

Third Embodiment

Figure 12:
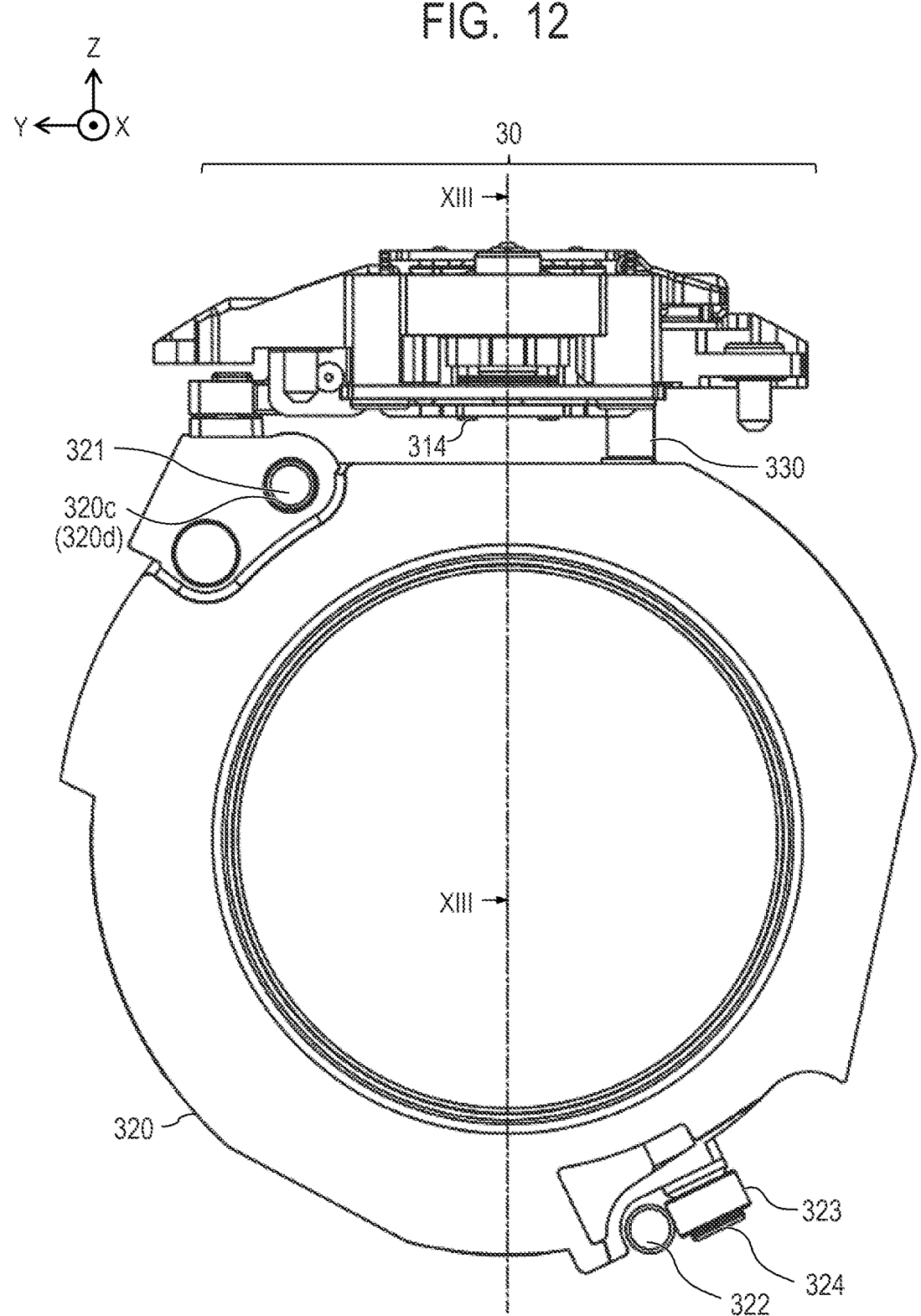
FIG. 12 is a side view for illustrating a driving device according to a third embodiment when seen from the X-axis direction.
Figure 13:
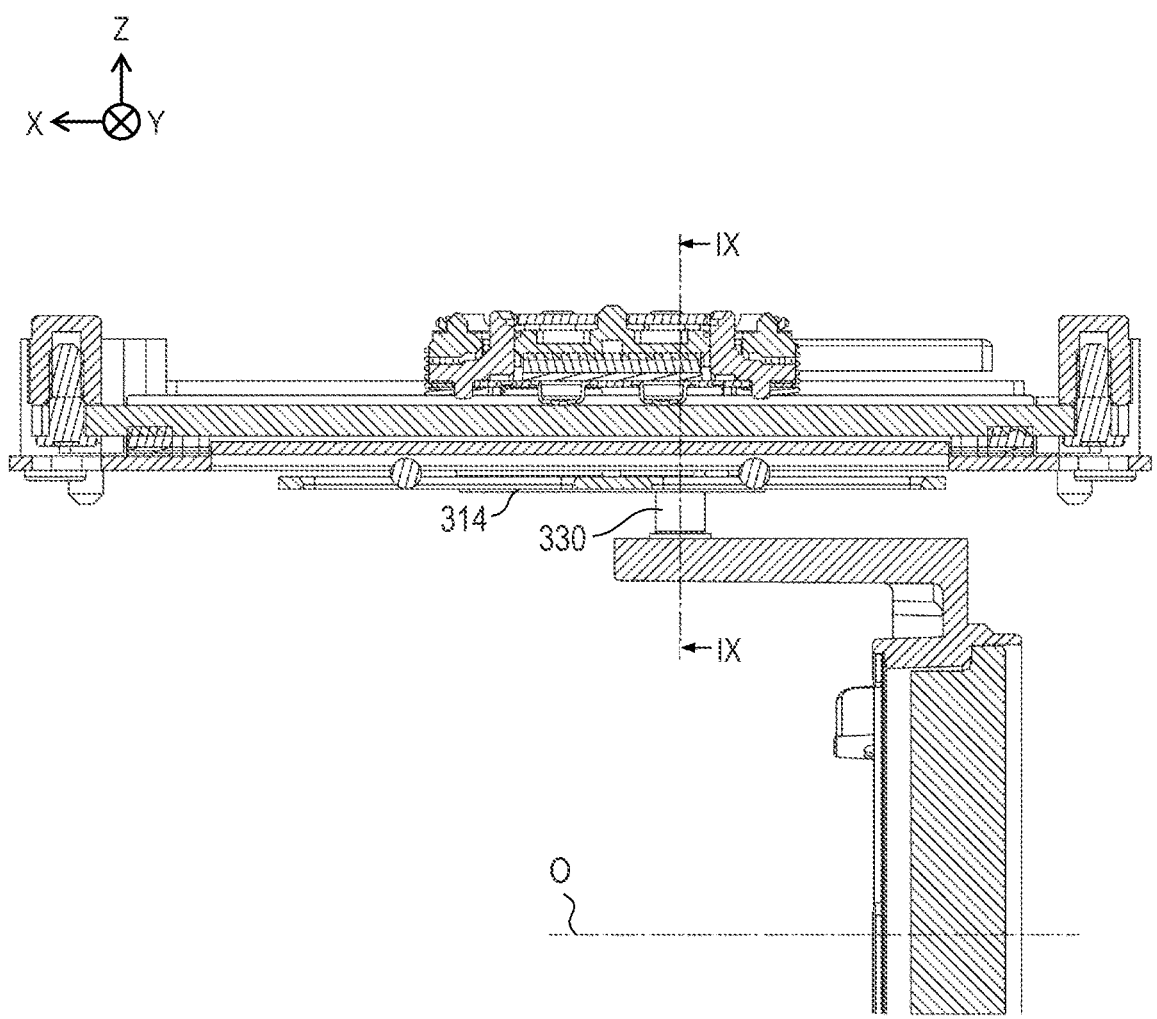
FIG. 13 is a sectional view for illustrating the driving device according to the third embodiment.
Figure 14:
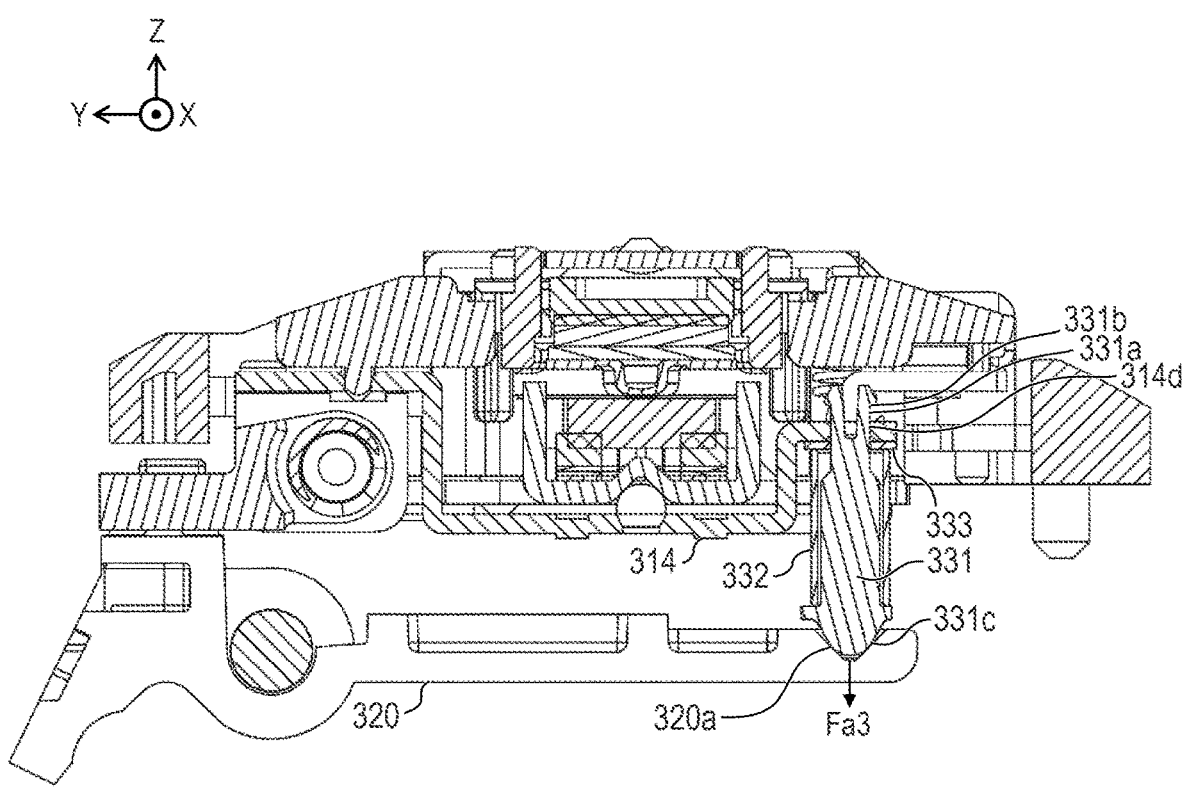
FIG. 14 is a sectional view for illustrating the driving device according to the third embodiment.
Figure 15A:
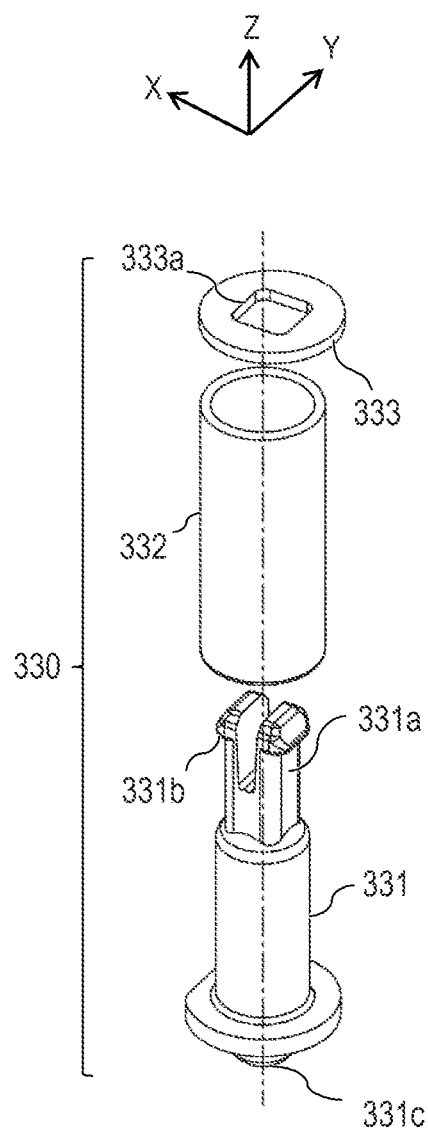
FIG. 15A is an exploded perspective view for illustrating a lens-barrel urging unit (330) in the third embodiment.
Figure 15B:
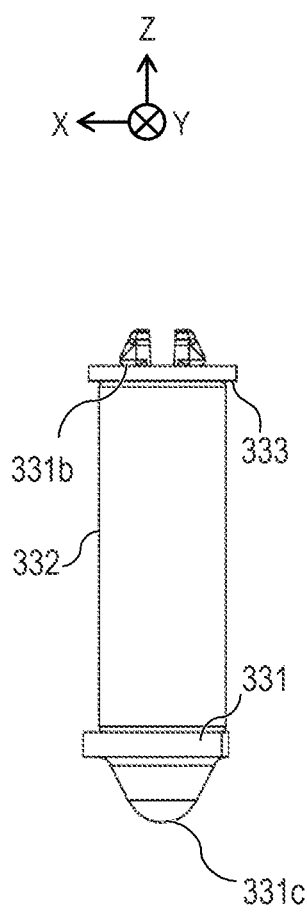
FIG. 15B is a front view for illustrating the lens-barrel urging unit (330) in the third embodiment.

Now, a third embodiment of the present disclosure is described with reference to FIG. 12 to FIG. 15B. FIG. 12 is a side view for illustrating a driving device according to the third embodiment when seen from the X-axis direction. FIG. 13 is a sectional view for illustrating the driving device taken along the line XIII-XIII of FIG. 12. FIG. 14 is a sectional view for illustrating the driving device taken along the line IX-IX of FIG. 13. FIG. 15A is an exploded perspective view for illustrating a lens-barrel urging unit 330 in the third embodiment. FIG. 15B is a front view for illustrating the lens-barrel urging unit 330 in the third embodiment. In the first embodiment, the urging mechanism formed by the shank member 131, the lens-barrel urging spring 132, and the projecting portion 120a is proposed. Meanwhile, in the third embodiment, there is proposed the lens-barrel urging unit 330 obtained by unitizing members forming the urging mechanism in order to improve ease of assembly, and description is made of a configuration employing the lens-barrel urging unit 330.

Also in the description of the third embodiment, only differences from the first embodiment are described, and description of common components is omitted. Similarly to the first embodiment, a lens holder 320 (holding member) in the third embodiment has two circular holes 320c (and 320d) into which a first guide bar 321 is to be fitted. The circular holes 320c (and 320d) are formed at positions shifted in the X-axis direction, and function as the second guide unit.

Further, a bearing 323 is provided on a side radially opposite to the circular hole 320c of the lens holder 320 so as to be rotatable about an axis of an axial screw 324. The second guide bar 322 being a rotation regulation member is held in abutment against the bearing 323, thereby regulating rotation of the lens holder 320 about the X axis. With this configuration, rotation of the lens holder 320 is regulated, and hence the lens holder 320 is guided linearly in the X-axis direction without rotating. The second guide bar 322 and the bearing 323 form the third guide unit in the third embodiment.

Next, description is made of a configuration of the lens-barrel urging unit 330 and urging performed on the lens holder 320. The lens-barrel urging unit 330 includes a shaft member 331 (shank member), a lens-barrel urging spring 332 (spring member or urging mechanism), and a washer 333 (washer member). The lens-barrel urging unit 330 has a first state in which those members are unitized, a second state in which the lens-barrel urging unit 330 is mounted into a movable-side rail member 314 (moving member), and a third state in which a vibration wave motor 30 (driving source) and the lens-barrel urging unit 330 are mounted into the lens holder 320.

First, assembly of the lens-barrel urging unit 330 is described. For assembly of the lens-barrel urging unit 330, the lens-barrel urging spring 332 is mounted to the shaft member 331 from a side of an elastic deformation portion 331a formed at one end portion of the shaft member 331. Moreover, the washer 333 is mounted to the shaft member 331. At the time of mounting of the washer 333, a stopper portion 331b formed at an end portion of the elastic deformation portion 331a is inserted into a square hole 333a formed in the washer 333 while the elastic deformation portion 331a is deformed. The square hole 333a climbs over the stopper portion 331b so that the lens-barrel urging spring 332 and the washer 333 are mounted to the shaft member 331.

After the washer 333 climbs over the stopper portion 331b, the lens-barrel urging spring 332 urges the washer 333, and thus the stopper portion 331b and the washer 333 are brought into abutment against each other and fixed to each other. Thus, assembly of three members, that is, the shaft member 331, the lens-barrel urging spring 332, and the washer 333 is completed, and the three members described above can be unitized. This state, in other words, a state in which only the three members are unitized corresponds to the first state illustrated in FIG. 15B.

Next, one end portion of the unitized lens-barrel urging unit 330 is pushed into a fitting hole 314d (see FIG. 14) of the movable-side rail member 314. While the elastic deformation portion 331a is elastically deformed, the lens-barrel urging unit 330 is inserted and mounted into the movable-side rail member 314 until the stopper portion 331b climbs over the fitting hole 314d. This state corresponds to the second state. After the unitized lens-barrel urging unit 330 is mounted into the movable-side rail member 314, the washer 333 and the stopper portion 331b are brought into abutment against a surface of the movable-side rail member 314, and the washer 333 and the stopper portion 331b, which have been held in abutment against each other before mounting of the lens-barrel urging unit 330, are separated from each other.

Finally, another end portion of the lens-barrel urging unit 330, which is opposite to the one end portion of the lens-barrel urging unit 330 mounted into the vibration wave motor 30, is mounted into the lens holder 320. The another end portion of the lens-barrel urging unit 330 is mounted until a distal end portion 331c of the shaft member 331 being a spherical protruding portion, and a conical recessed portion 320a formed in the lens holder 320 are brought into abutment against each other. This state corresponds to the third state illustrated in FIG. 14.

At this time, the stopper portion 331b and the fitting hole 314d of the movable-side rail member 314 are separated from each other, and the lens-barrel urging spring 332 is compressed between the lens holder 320 and the movable-side rail member 314, thereby generating a desired urging force Fa3.

Under the first state, the stopper portion 331b and the washer 333 are held in abutment against each other, and the lens-barrel urging spring 332 is held as the lens-barrel urging unit 330. Under the second state, the movable-side rail member 314 is sandwiched between the washer 333 and the stopper portion 331b. Thus, the movable-side rail member 314 and the stopper portion 331b are held in abutment against each other, and the washer 333 and the stopper portion 331b are separated from each other. Further, the lens-barrel urging unit 330 is held in the vibration wave motor 30. Under the third state, the movable-side rail member 314 and the stopper portion 331b are separated from each other, and the urging force Fa3 exerted by the lens-barrel urging spring 332 acts between the movable-side rail member 314 and the lens holder 320.

In the configuration of the first embodiment, when the lens-barrel urging spring 132 is arranged on the lens holder 120 and the vibration wave motor 10 is mounted from the Z-axis direction, it is difficult to align the lens-barrel urging spring 132 and the shank member 131 being a receiving portion. However, with the configuration of the third embodiment, when the distal end portion 331c of the lens-barrel urging unit 330 is brought into abutment against an inclined surface of the recessed portion 320a of the lens holder 320, the lens-barrel urging unit 330 moves so as to correct misalignment, thereby obtaining an effect of remarkably improving ease of assembly. Moreover, the lens-barrel urging unit 330 is arranged at a position shifted from a center of the lens holder 320 in the Y-axis direction when seen from the X-axis direction. With this arrangement, the lens-barrel urging spring 332 overlaps the vibration wave motor 30 inside the vibration wave motor 30. Accordingly, the vibration wave motor 30 and the lens holder 320 can be arranged closer to each other, and hence have a configuration capable of achieving downsizing in a radial direction.

With the configuration described above, ease of assembly of the driving device including the vibration wave motor 30 and a lens barrel 31 can be improved, and downsizing of the device can be achieved at the same time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. A driving device comprising:
    a holding member configured to hold an optical element; and
    a driving mechanism including a moving member configured to drive the holding member in a direction along an optical axis of the optical element;
    a coupling member configured to couple the moving member and the holding member to each other and transmit power from the driving mechanism;
    a first guide bar configured to guide the holding member in the direction along the optical axis,
    a biasing mechanism configured to bias the holding member in a rotational direction around the first guide bar, and
    wherein the coupling member and the biasing mechanism are arranged at different positions as viewed along the optical axis.

2. The driving device according to claim 1, further comprising:
   a guide unit configured to guide the driving mechanism to enable the driving mechanism to rotate relative to the holding member,
   the moving member is connected to the holding member to regulate rotation of the driving mechanism.

3. The driving device according to claim 2, further comprising:
   a second guide bar configured to guide the holding member, and
   the second guide bar regulates rotation of the holding member.

4. The driving device according to claim 3, wherein:
   the holding member includes an abutment portion abutting the second guide bar,
   the following relationship is satisfied:
   $$L2 > L1 > L0,$$
   where L2 is a distance from the first guide bar to the second guide bar as viewed along the optical axis, L1 is a distance from the first guide bar to the biasing mechanism, and L0 is a distance from the first guide bar to the coupling member.

5. The driving device according to claim 2, wherein:
   the guide unit includes:
      a V-shaped groove in the moving member; and
      a plurality of rolling members held in abutment against the V-shaped groove, and
   a line connecting an abutment point of the coupling member and an applied point of a biasing force generated by the biasing mechanism, and a line connecting the plurality of rolling members intersect with each other.

6. The driving device according to claim 1, wherein the biasing mechanism is provided between the moving member and the holding member, and includes a spring member, a washer member, and a shank member, which is brought into abutment against a recessed portion of the holding member.

7. The driving device according to claim 6, wherein the biasing mechanism is in:
   a first state where a stopper portion of the shank member and the washer member are held in abutment against each other,
   a second state where the stopper portion and the moving member are held in abutment against each other, and
   a third state where the stopper portion and the moving member are separated from each other, and a biasing force exerted by the spring member acts between the moving member and the holding member.

8. The driving device according to claim 1, wherein the driving mechanism includes a vibration wave motor.

9. The driving device according to claim 1, wherein the following relationship is satisfied:
   $$L1 > L0,$$
   where L1 is a distance from the first guide bar to the biasing mechanism as viewed along the optical axis, and L0 is a distance from the first guide bar to the coupling member.

10. The driving device according to claim 1, wherein the optical element is a focusing lens.

11. An image pickup apparatus comprising:
    a lens barrel including a holding member configured to hold an optical element; and
    a driving mechanism including:
       a moving member configured to drive the holding member in a direction along an optical axis of the optical element; and
       a coupling member configured to couple the moving member and the holding member to each other and transmit power from the driving mechanism;
    a guide bar configured to guide the holding member in the direction along the optical axis,
    a biasing member configured to bias the holding member in a rotational direction around the guide bar toward, and
    wherein the coupling member and the member are arranged at different positions as viewed along the optical axis.

* * * * *